US012682853B2

(12) United States Patent
Cheng

(10) Patent No.: US 12,682,853 B2
(45) Date of Patent: Jul. 14, 2026

(54) METHOD OF CONTROLLING DISPLAY PANEL BY ADJUSTING TIMING OF SCAN CONTROL SIGNAL AND RELATED DISPLAY DRIVER CIRCUIT

(71) Applicant: NOVATEK Microelectronics Corp., Hsin-Chu (TW)

(72) Inventor: Huan-Teng Cheng, Hsinchu City (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/767,955

(22) Filed: Jul. 9, 2024

(65) Prior Publication Data

US 2025/0078769 A1 Mar. 6, 2025

Related U.S. Application Data

(60) Provisional application No. 63/536,487, filed on Sep. 4, 2023.

(51) Int. Cl.
*G09G 3/3266* (2016.01)

(52) U.S. Cl.
CPC ....... *G09G 3/3266* (2013.01); *G09G 2310/08* (2013.01); *G09G 2320/0233* (2013.01)

(58) Field of Classification Search
CPC ............. G09G 3/3266; G09G 2310/08; G09G 2320/0233
See application file for complete search history.

(56) References Cited

U.S. PATENT DOCUMENTS

| | | | | |
|---|---|---|---|---|
| 2007/0126683 A1* | 6/2007 | Sung | G09G 3/3233 | 345/92 |
| 2019/0340973 A1* | 11/2019 | Kim | G09G 3/3233 | |
| 2022/0319371 A1* | 10/2022 | Kim | G09G 3/20 | |
| 2023/0086857 A1* | 3/2023 | Lee | G09G 3/3233 | 345/625 |
| 2023/0136391 A1 | 5/2023 | Hong | | |
| 2023/0154411 A1* | 5/2023 | Lee | G06V 40/1306 | 345/204 |
| 2023/0206824 A1* | 6/2023 | Go | G09G 3/2077 | 345/691 |
| 2023/0230535 A1* | 7/2023 | Hu | G09G 3/3266 | 345/55 |
| 2023/0410741 A1* | 12/2023 | Lee | G09G 3/3233 | |

FOREIGN PATENT DOCUMENTS

| | | |
|---|---|---|
| CN | 116092416 | 5/2023 |
| TW | 202226216 | 7/2022 |

* cited by examiner

*Primary Examiner* — Kwang-Su Yang
(74) *Attorney, Agent, or Firm* — Winston Hsu

(57) ABSTRACT

A method of controlling a display panel comprising a plurality of pixels includes a step of outputting a scan control signal to the display panel in a plurality of frame periods. The scan control signal has a first timing setting in a first frame period among the plurality of frame periods, and has a second timing setting in a second frame period among the plurality of frame periods, wherein the second timing setting is different from the first timing setting. A plurality of scan signals generated from the scan control signal are output to the plurality of pixels respectively and sequentially.

14 Claims, 15 Drawing Sheets

METHOD OF CONTROLLING DISPLAY PANEL BY ADJUSTING TIMING OF SCAN CONTROL SIGNAL AND RELATED DISPLAY DRIVER CIRCUIT

CROSS REFERENCE TO RELATED APPLICATIONS

This application claims the benefit of U.S. Provisional Application No. 63/536,487, filed on Sep. 4, 2023. The content of the application is incorporated herein by reference.

BACKGROUND OF THE INVENTION

1. Field of the Invention

The present invention relates to a method of controlling a display panel, and more particularly, to a method of controlling an organic light-emitting diode (OLED) panel and a related display driver circuit.

2. Description of the Prior Art

In recent years, the dark band problem easily appears on a display panel under low luminance, especially on a low-temperature polycrystalline oxide (LTPO) organic light-emitting diode (OLED) panel. At present, people in the industry mostly apply the Demura method to compensate for the brightness difference in the dark band. However, due to the insufficient compensation capabilities of Demura, the dark band problem cannot be completely solved. In addition, several product manufacturers apply an approach of dynamically adjusting the initial voltage of the OLED anode to solve the dark band problem, but this approach may affect other areas without dark bands. Further, the initial voltage may be output to the anode of the OLED, in order to keep the cross-voltage of the OLED constant. However, if dynamic compensation is applied to adjust the initial voltage, it is not feasible to control the anode voltage to track the cathode voltage of the OLED to keep the cross-voltage of the OLED constant, resulting in image sticking problems on the display panel. The long-term voltage offset at the anode terminal of the OLED also causes different stresses in the pixel circuits in the dark band area, thereby reducing the reliability of the OLED panel.

SUMMARY OF THE INVENTION

It is therefore an objective of the present invention to provide a novel method of controlling a display panel and a related display driver circuit, in order to solve the above-mentioned problems.

An embodiment of the present invention discloses a method of controlling a display panel, which comprises a plurality of pixels. The method comprises a step of outputting a scan control signal to the display panel in a plurality of frame periods. The scan control signal has a first timing setting in a first frame period among the plurality of frame periods, and has a second timing setting in a second frame period among the plurality of frame periods, wherein the second timing setting is different from the first timing setting. A plurality of scan signals generated from the scan control signal are output to the plurality of pixels respectively and sequentially.

Another embodiment of the present invention discloses a display driver circuit for controlling a display panel, which comprises a plurality of pixels. The display driver circuit outputs a scan control signal to the display panel in a plurality of frame periods. The scan control signal has a first timing setting in a first frame period among the plurality of frame periods, and has a second timing setting in a second frame period among the plurality of frame periods, wherein the second timing setting is different from the first timing setting. A plurality of scan signals generated from the scan control signal are output to the plurality of pixels respectively and sequentially.

These and other objectives of the present invention will no doubt become obvious to those of ordinary skill in the art after reading the following detailed description of the preferred embodiment that is illustrated in the various figures and drawings.

DETAILED DESCRIPTION

In the present invention, the dark band problem on the organic light-emitting diode (OLED) panel may be improved by adjusting the scan timing of a scan signal for the initial voltage of the OLED pixels, and the initial voltage needs not to be adjusted dynamically. Therefore, the cross-voltage of the OLED may be kept constant and the OLED may be operated normally. Through the method of the present invention, the dark band problem may be solved, and the reliability of the OLED panel may be improved.

Modern OLED panels on the market mostly apply an 8TIC structure. In this pixel structure, the low-temperature polycrystalline oxide (LTPO) technology is utilized to set up indium gallium zinc oxide thin-film transistors (IGZO-TFTs), to reduce the leakage charges of the storage capacitor in the pixel, so as to maintain the image content at a low refresh rate, thereby achieving the applications of an extremely low frame rate. However, in recent years, the industry has discovered that the OLED panels with the 8TIC structure are prone to dark band problems. This is because during the scanning process of the OLED pixels, the initial voltage (also known as the reset voltage) of the OLED anode will undergo load changes, causing an offset in the initial voltage received by different areas of the panel, thus resulting in the dark band problems.

Figure 1:
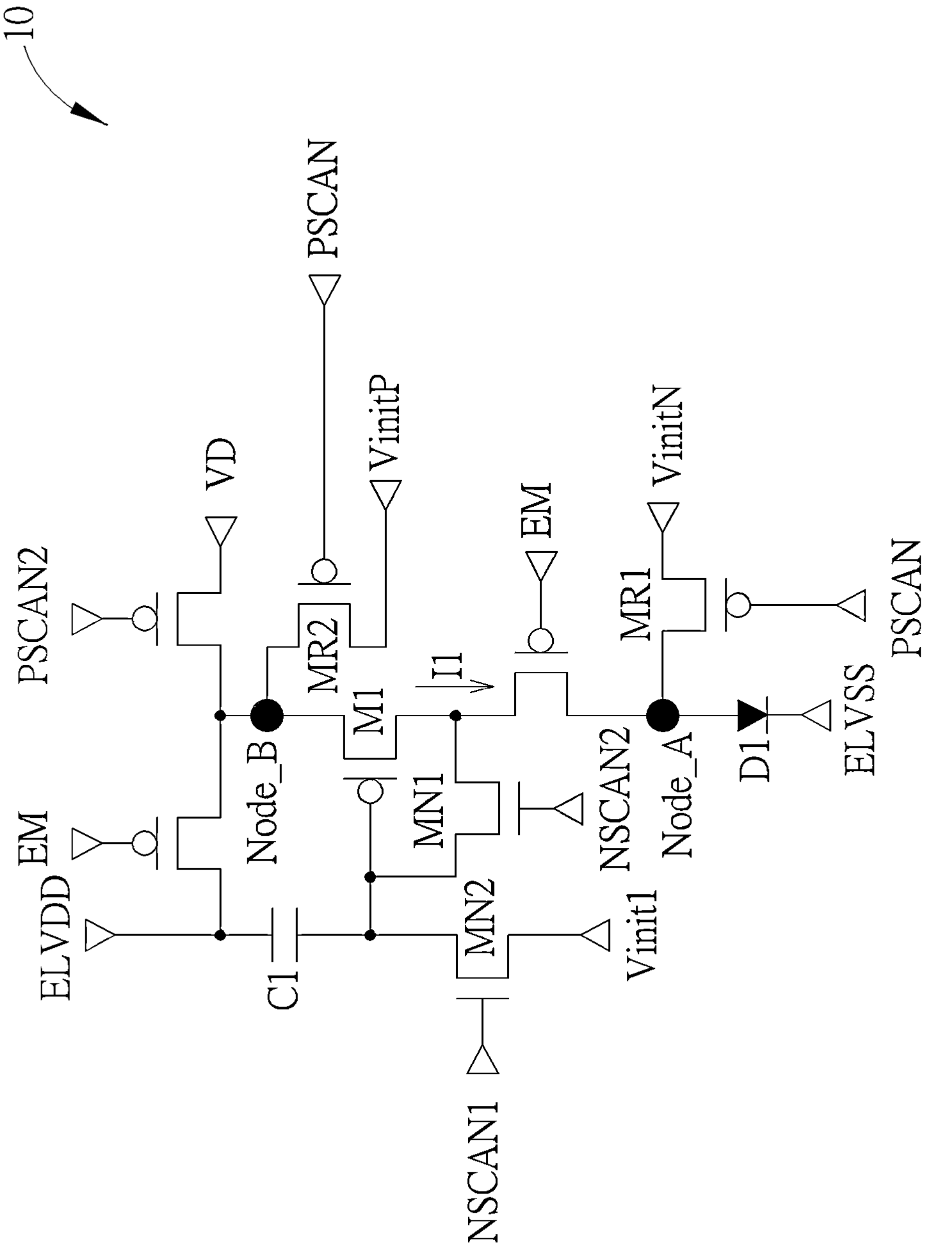
FIG. 1 is a schematic diagram of a pixel circuit according to an embodiment of the present invention.

FIG. 1 is a schematic diagram of a pixel circuit 10 according to an embodiment of the present invention. The pixel circuit 10 includes 8 transistors, a storage capacitor C1 and a light emitting device D1 to realize the 8TIC structure. Among these 8 transistors, most transistors are PMOS transistors, while the transistors MN1 and MN2 coupled to the storage capacitor C1 are NMOS transistors formed by IGZO, for reducing the leakage charges of the storage capacitor C1. The transistor M1 is a driving transistor, for generating a driving current I1 to be provided for the light emitting device D1 according to a display data VD received from a display driver circuit, to control the light emitting device D1 to perform light emission. The light emitting device D1, which may be an OLED or any other device capable of light emission, may emit light to generate a desired image according to the driving current I1 received from the driving transistor M1.

The transistors MR1 and MR2 are reset transistors used for forwarding initial voltages VinitN and VinitP to initialize the pixel circuit 10. More specifically, the initial voltage VinitN is forwarded to a node Node_A to initialize the light emitting device D1. In an embodiment, the light emitting device D1 may be an OLED, and the node Node_A is the anode terminal of the OLED. The initial voltage VinitP is forwarded to a node Node_B to initialize the driving transistor M1. In a preferable embodiment, the initial voltage VinitP may be a positive voltage and the initial voltage VinitN may be a negative voltage. In fact, the level of the initial voltage VinitP may be equal to or different from the level of the initial voltage VinitN, and the implementations of these initial voltages should not limit the scope of the present invention. In addition, the pixel circuit 10 may also receive another initial voltage Vinit1 through the transistor MN2, and the initial voltage Vinit1 may have any appropriate level.

The pixel circuit 10 is operated by receiving power supply voltages ELVDD and ELVSS, and also receiving related control signals, including scan signals PSCAN, PSCAN2, NSCAN1 and NSCAN2 and an emission control signal EM. Among these scan signals, the scan signal PSCAN is used to control the transistor MR1 to forward the initial voltage VinitN to the node Node_A, and also used to control the transistor MR2 to forward the initial voltage VinitP to the node Node_B. Therefore, according to the scan signal PSCAN, the initial voltage VinitN may be output to initialize the light emitting device D1, and the initial voltage VinitP may be output to initialize the driving transistor M1. In general, the scan signal PSCAN may be output to the pixels on a display panel row by row, to control the pixels to receive the initial voltages VinitN and VinitP. In an alternative embodiment, the transistors MR1 and MR2 may receive controls from different scan signals.

In the pixel circuit 10, the brightness of the light emitting device D1 is determined by the magnitude of the driving current I1 and also affected by the voltages at the nodes Node_A and Node_B. Therefore, the relevant nodes Node_A and Node_B need to be reset before the driving current I1 is output to the light emitting device D1. In the initial phase (also called the reset phase), the transistors MR1 and MR2 will be turned on through the scan signal PSCAN, allowing the initial voltage VinitN to be output to the node Node_A and the initial voltage VinitP to be output to the node Node_B, in order to reset the driving transistor M1 and the light emitting device D1. The levels of the initial voltages VinitN and VinitP may be preset, and their voltage levels are used to enable the driving transistor M1 to respond quickly when receiving the display data VD, thereby reducing image sticking. Assuming that the light emitting device D1 is an OLED, the initial voltage VinitN, which is output to the anode terminal of the OLED, is used for determining the cross-voltage of the OLED (i.e., the voltage difference between VinitN and ELVSS); hence, the magnitude of the initial voltage VinitN should be constant to avoid unexpected deviations in the brightness of the OLED.

In order to ensure that the voltages of the nodes Node_A and Node_B are well controlled, the transistors MR1 and MR2 should be periodically turned on to reset the nodes Node_A and Node_B. In general, the 8TIC OLED panel needs to support an extremely low frame rate (e.g., 1 Hz), and thus it may be reset 3 or 4 times within 1 frame period to ensure that the nodes Node_A and Node_B are always maintained at the target voltage level, thereby keeping the target brightness constant.

Figure 2:
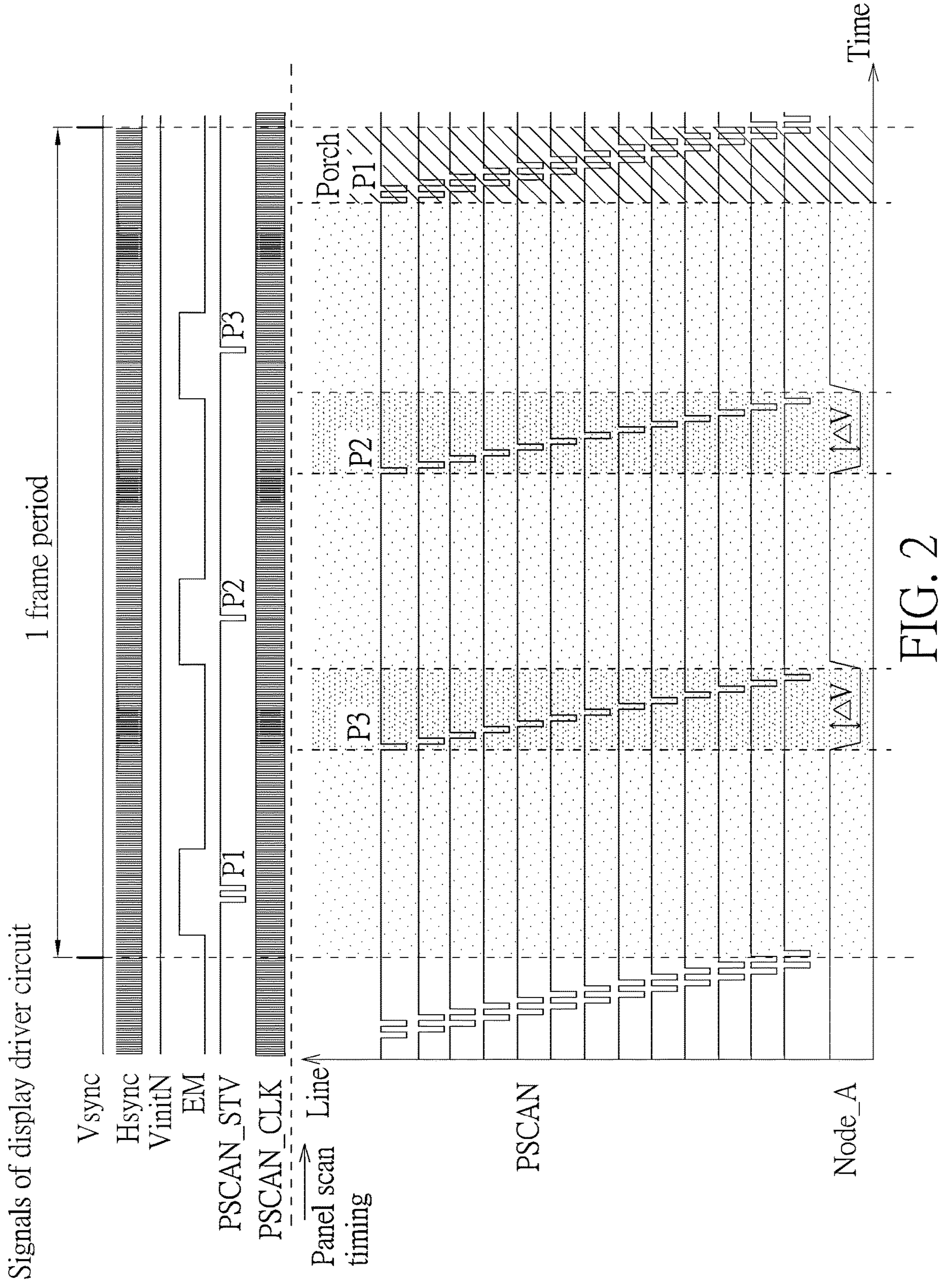
FIG. 2 is a timing diagram of a display driver circuit outputting control signals to reset the pixels on a display panel.

FIG. 2 is a timing diagram of a display driver circuit outputting control signals to reset the pixels on a display panel, where the upper half of FIG. 2 (above the dashed line) shows the signals of the display driver circuit, and the lower half of FIG. 2 (below the dashed line) shows the timing of the scan signal PSCAN received by each row of pixels. As shown in FIG. 2, the display driver circuit may output an initial voltage VinitN, an emission control signal EM, a scan control signal PSCAN_STV, and a scan control clock PSCAN_CLK to the display panel. A vertical synchronization signal Vsync and a horizontal synchronization signal Hsync, which are used to define the timing of the display driver circuit, are also shown in FIG. 2 to facilitate the illustrations. The vertical synchronization signal Vsync is used to define a frame period for display of a frame of image. The horizontal synchronization signal Hsync is used to define a line time for controlling a row of pixels. The initial voltage VinitN refers to the initial voltage VinitN (or VinitP) received by the pixel circuit 10 shown in FIG. 1. The emission control signal EM may refer to the emission control signal EM received by the pixel circuit 10 shown in FIG. 1, or may be used to generate the emission control signal EM received by the pixel circuit 10. The scan control signal PSCAN_STV and the scan control clock PSCAN_CLK may be output to a gate-on-array (GOA) circuit of the display panel. The GOA circuit may generate the scan signals PSCAN to be sequentially output to the pixel rows according to the scan control signal PSCAN_STV and the scan control clock PSCAN_CLK. The scan signals PSCAN shown in FIG. 2 refer to the scan signals PSCAN output to different pixel rows on the display panel, as the scan signal PSCAN received by the pixel circuit 10 shown in FIG. 1.

Figure 3:
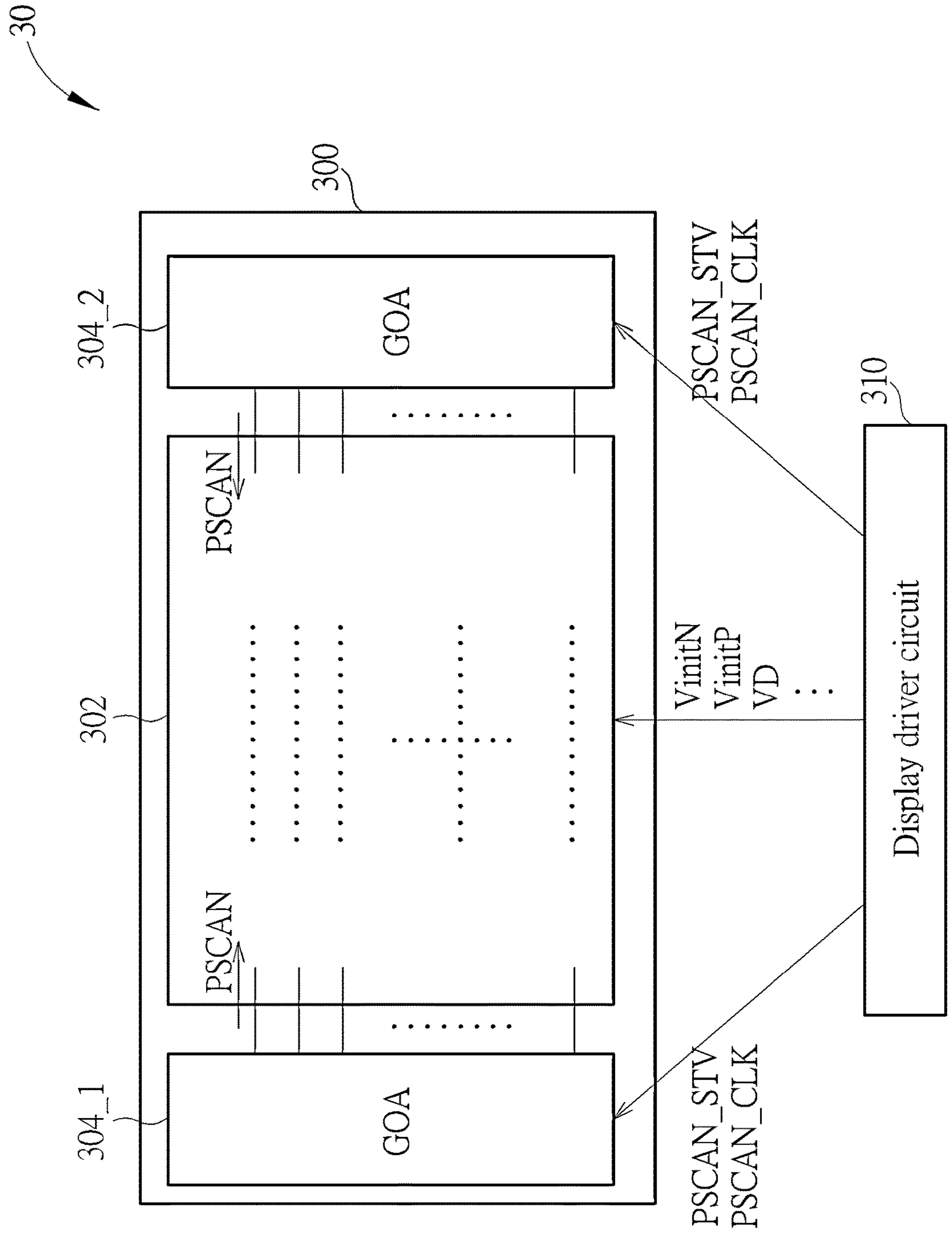
FIG. 3 is a schematic diagram of a display system according to an embodiment of the present invention.

FIG. 3 is a schematic diagram of a display system 30 according to an embodiment of the present invention. The display system 30 includes a display panel 300 and a display driver circuit 310. The display panel 300 includes an active area (AA) 302 and two GOA circuits 304_1 and 304_2 respectively deployed on the left side and the right side of the AA 302. The GOA circuits 304_1 and 304_2 may be deployed with shift registers (not shown), which may receive the scan control signal PSCAN_STV and the scan control clock PSCAN_CLK from the display driver circuit 310, and generate and output the scan signal PSCAN for each row of pixels in the AA 302 through shifting. For example, each of the GOA circuits 304_1 and 304_2 may include multiple channels corresponding to multiple rows of pixels on the display panel 300, and the scan control signal PSCAN_STV may shift in these channels to sequentially generate the scan signal PSCAN for each pixel row.

In addition, the display driver circuit 310 may output the initial voltages VinitN and VinitP to the AA 302 of the display panel 300 to reset the pixels in an initial phase, and output the display data VD to the AA 302 of the display panel 300 in a data writing phase. The display driver circuit 310 may also provide the emission control signal EM for the pixels in the AA 302. The emission control signal EM may be output to another GOA circuit of the display panel 300, which is omitted in FIG. 3 for brevity.

In an embodiment, the display panel 300 may be an OLED panel, mini-LED panel, micro-LED panel, or any other self-luminous panel. The display driver circuit 310 may be a display driver integrated circuit (DDIC) implemented in a chip, but not limited thereto.

Referring to FIG. 3 along with FIG. 2, during a frame period defined by the vertical synchronization signal Vsync, the display driver circuit outputs 3 pulse signals P1-P3 in the scan control signal PSCAN_STV, which are converted into the 3 pulse signals P1-P3 in each scan signal PSCAN with a timing order of P1, P2 and then to P3. With these 3 pulse signals P1-P3, each pixel may be reset 3 times during a frame period. As shown in FIG. 1, the transistors of the pixel circuit 10 that receive the scan signal PSCAN are PMOS transistors (e.g., MR1 and MR2), and thus the pulse signals P1-P3 are low-active pulses that may turn on the corresponding transistors to reset the pixel circuit 10.

Note that the upper half of FIG. 2 illustrates the timing of the signals generated or output by the display driver circuit 310, and its time axis indicates a sequential output from left to right; that is, the left side represents earlier signals and the right side represents later signals. The lower half of FIG. 2 illustrates the timing sequence of each row of pixels on the display panel 300 receiving the scan signal PSCAN, where the scan signal PSCAN scans sequentially from top to bottom on the display panel 300; that is, the pixels in the upper rows receive a pulse signal P1-P3 of the scan signal PSCAN before the pixels in the lower rows receive the same pulse signal P1-P3.

The lower half of FIG. 2 may also be interpreted as the shifting of the scan signals PSCAN to different positions on the display panel 300, where each scan signal PSCAN scans from left to right. The left side represents the top of the display panel 300 and the right side represents the bottom of the display panel 300. Therefore, under the operation of 3 resets during one frame period, when the pulse signal P1 shifts to approximately ⅓ of the position from top to bottom of the display panel 300, the pulse signal P2 starts to scan. When the pulse signal P1 shifts to approximately ⅔ of the position from top to bottom of the display panel 300, the pulse signal P2 shifts to approximately ⅓ of the position, and the pulse signal P3 starts to scan at this moment.

The right-most side contains a porch area, which is outside the AA 302 of the display panel 300 and does not have any pixel circuits. In such a situation, the pulse signal P1 output first is located on the right side of the diagram (i.e., at the lower place of the display panel 300), and the pulse signal P3 output later is located on the left side of the diagram (i.e., at the upper place of the display panel 300). As shown in FIG. 2, when the pulse signal P1 enters the porch area, the pulse signal P2 shifts to approximately ⅔ of the position from top to bottom of the display panel 300, and the pulse signal P3 shifts to approximately ⅓ of the position. When the pulse signal P1 leaves the porch area, the first pulse signal of the next frame period enters the 1$^{st}$ row of the AA 302 and starts to scan.

Note that each of the pulse signals P1-P3 may have any number of pulses according to practical requirements. In this embodiment, the pulse signal P1 has 2 pulses and the pulse signals P2 and P3 have only 1 pulse. This is because the pulse signal P1 may perform control along with the input of the display data VD. In detail, as shown in FIG. 1, the display data VD entering the pixel circuit 10 reaches the storage capacitor C1 from the node Node_B and through the diode-connected circuit composed of the transistors M1 and MN1; hence, the time the initial voltage VinitP enters the node Node_B needs to be staggered with the time the display data VD is written into the pixel circuit 10, to prevent the voltage level of the display data VD from being interfered with. Preferably, before and after the display data VD is written into the pixel circuit 10, the node Node_B should be reset to reach its target level, allowing the overall behavior of writing data into pixels to be consistent. Therefore, turn-on pulses are applied to control the transistor MR2 to be turned on before and after the display data VD is written, respectively. In other words, the display data VD is written in the time interval between the two pulses of the pulse signal P1.

In addition, since the pulse signals P2 and P3 do not proceed with writing of the display data VD, they may be set to have one pulse. Note that the patterns of the pulse signals P1-P3 are not limited thereto. However, it should be noted that the nodes Node_A and Node_B are both located on the current path that drives the light emitting device D1 to emit light, so these nodes Node_A and Node_B are requested to be reset during the period without light emission, to prevent the light emission from being influenced by the initial voltages VinitN and VinitP. In other words, the pulse signals P1-P3 may be output to the pixels when the corresponding emission control signal EM is in a high level that disables the emission of the light emitting device D1. The pixel circuit 10 of FIG. 1 shows that the emission control signal EM is output to PMOS transistors, and thus the emission control signal EM in the high level will disable light emission and in the low level will enable light emission.

The initial voltage VinitN output to the pixels on the display panel 300 is provided by the display driver circuit 310. In general, the display driver circuit 310 may use a voltage regulator to generate and output a constant initial voltage VinitN to each pixel. In the embodiment of FIG. 2, there are 3 resets performed during each frame period. Assuming that the total pulse width of each of the pulse signals P1-P3 covers L lines of pixels (L may be an appropriate positive integer), there are 3L lines of pixels being simultaneously charged through the initial voltage VinitN most of the time (it is assumed here that the sum of the two pulse widths of the pulse signal P1 is equal to L lines).

However, as shown in FIG. 2, when the pulse signal P1 enters the porch area, because there is no pixel circuit in the porch area, the number of pixels being charged at the same time is reduced. This causes the load of the voltage regulator used for outputting the initial voltage VinitN to be reduced, resulting in an offset of the voltage level of the initial voltage VinitN received by the node Node_A. For example, at the time when the pulse signal P1 completely enters the porch area, there will only be 2L lines of pixels being charged, which means that the load faced by the initial voltage VinitN is reduced to about ⅔ of the original. In an embodiment, the initial voltage VinitN may be a negative voltage, and thus the reduction of the load will cause the negative voltage to shift to a more negative level. As shown in FIG. 2, the maximum offset of the initial voltage VinitN appearing on the node Node_A is ΔV. This offset will cause the driving current I1 to decrease, thereby reducing the brightness of the light emitting device D1. The relationship between the driving current I1 and the offset ΔV may follow the following formula:

$$I1 = K(VinitN - VD - \Delta V). \quad (1)$$

According to Formula (1), when the offset ΔV increases, the driving current I1 will decrease. This in turn decreases the brightness of the light emitting device D1 and causes the generation of a dark band. In general, the dark band phenomenon is more evident under low luminance.

The above load reduction phenomenon occurs when the pulse signal P1 shifts to the porch area; hence, the brightness will decrease at the positions to which the other two pulse signals P2 and P3 shift when the pulse signal P1 is in the porch area. More specifically, at this moment, the pulse signal P2 shifts to approximately ⅔ of the position and the pulse signal P3 shifts to approximately ⅓ of the position from top to bottom of the display panel 300. Assuming that the pulse signals P1-P3 in each frame period all scan with equal spacing, when any of the pulse signals P1-P3 shifts to the porch area, the other two pulse signals in the AA must be located at approximately ⅓ and ⅔ positions. In other words, no matter which position each pulse signal P1-P3 scans to, the dark band always appears at a substantially fixed position and range on the display panel 300. When 3 resets are performed within a frame period (3 pulse signals in a frame), there will be 2 dark bands on the display panel; and when 4 resets are performed within a frame period (4 pulse signals in a frame), there will be 3 dark bands on the display panel. By the same token, when there are N resets performed within a frame period, there will be N−1 dark bands on the display panel; that is, the position and number of dark bands depend on the scan settings of the display panel. Most of the mainstream display panels currently on the market apply a 3-reset/frame approach, so there are 2 dark bands on the display panel to divide the display area into three equal parts. Therefore, the dark band phenomenon is also called the three-part-separated screen phenomenon.

Regardless of the brightness or application situations, as long as the display panel 300 is lit on, if the scan signal PSCAN always scans with the same timing, the dark bands will remain at the same position on the display panel 300. Under long-term operations, the pixels in the dark band position continuously receive the initial voltage VinitN having an offset ΔV. In the long run, these pixels will undergo different stresses, resulting in different degrees of loss appearing on the devices in these pixels.

Figure 4:
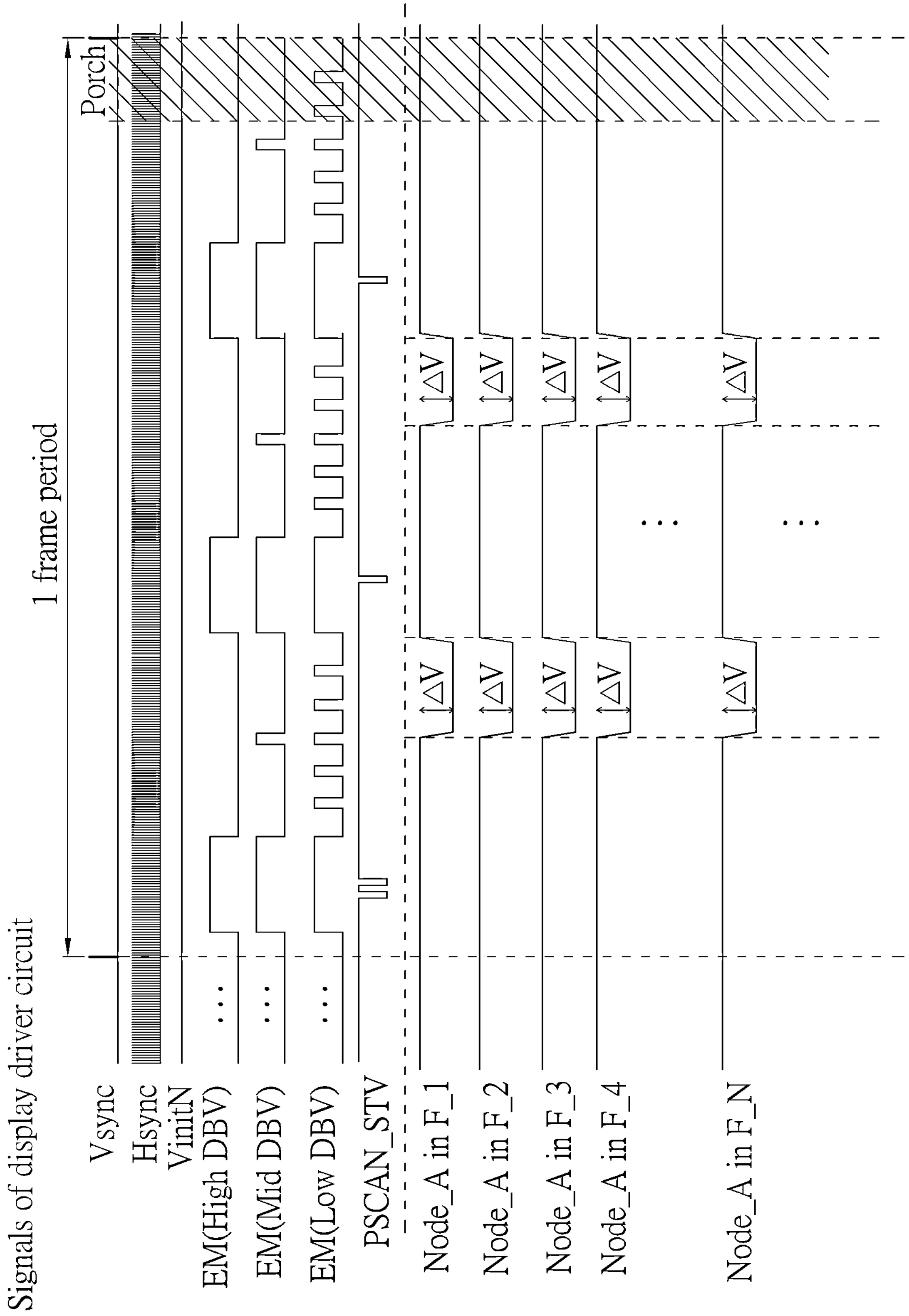
FIG. 4 illustrates the control signals of the display driver circuit and the offset of the initial voltage received by the node in the pixels in multiple frame periods.

FIG. 4 illustrates the control signals of the display driver circuit 310 and the offset ΔV of the initial voltage VinitN received by the node Node_A in the pixels in multiple frame periods. As shown in the lower half of FIG. 4 (below the dashed line), in all frame periods from F_1 to F_N or even subsequent frame periods (where N may be any positive integer), the offset ΔV of the initial voltage VinitN appears at the same position, thus forming the dark band at the same position. Since the initial voltage VinitN is transmitted to the light emitting device D1 of the pixels, the light emitting device D1 of the pixels in the dark band areas will continuously receive a lower initial voltage VinitN. In the long run, these light emitting devices D1 will be subject to different degrees of stress as compared to the light emitting devices D1 in other areas/pixels. This may cause a more serious loss and reduce the reliability of the overall display panel 300.

Furthermore, as shown in the upper half of FIG. 4 (above the dashed line), the display driver circuit 310 may output different emission control signals EM under different settings of display brightness value (DBV). For example, in a high DBV setting, the emission control signals EM may only include 3 high pulses (turn-off pulses) in a frame period. In a medium (mid) DBV setting, the emission control signals EM may include 6 high pulses in a frame period and the total pulse width is longer. In a low DBV setting, the emission control signals EM may include 18 high pulses in a frame period and the total pulse width is longest. Under the DBV settings corresponding to different brightness, the main turn-off pulses (the longest high pulses) of the emission control signals EM are all located at the same positions, and thus the scan control signal PSCAN_STV will always be output with the same timing. As a result, no matter how the DBV setting changes, the position of the dark bands will not change, which will cause stress problems on the light emitting devices in the dark band areas in the long run.

Figure 5:
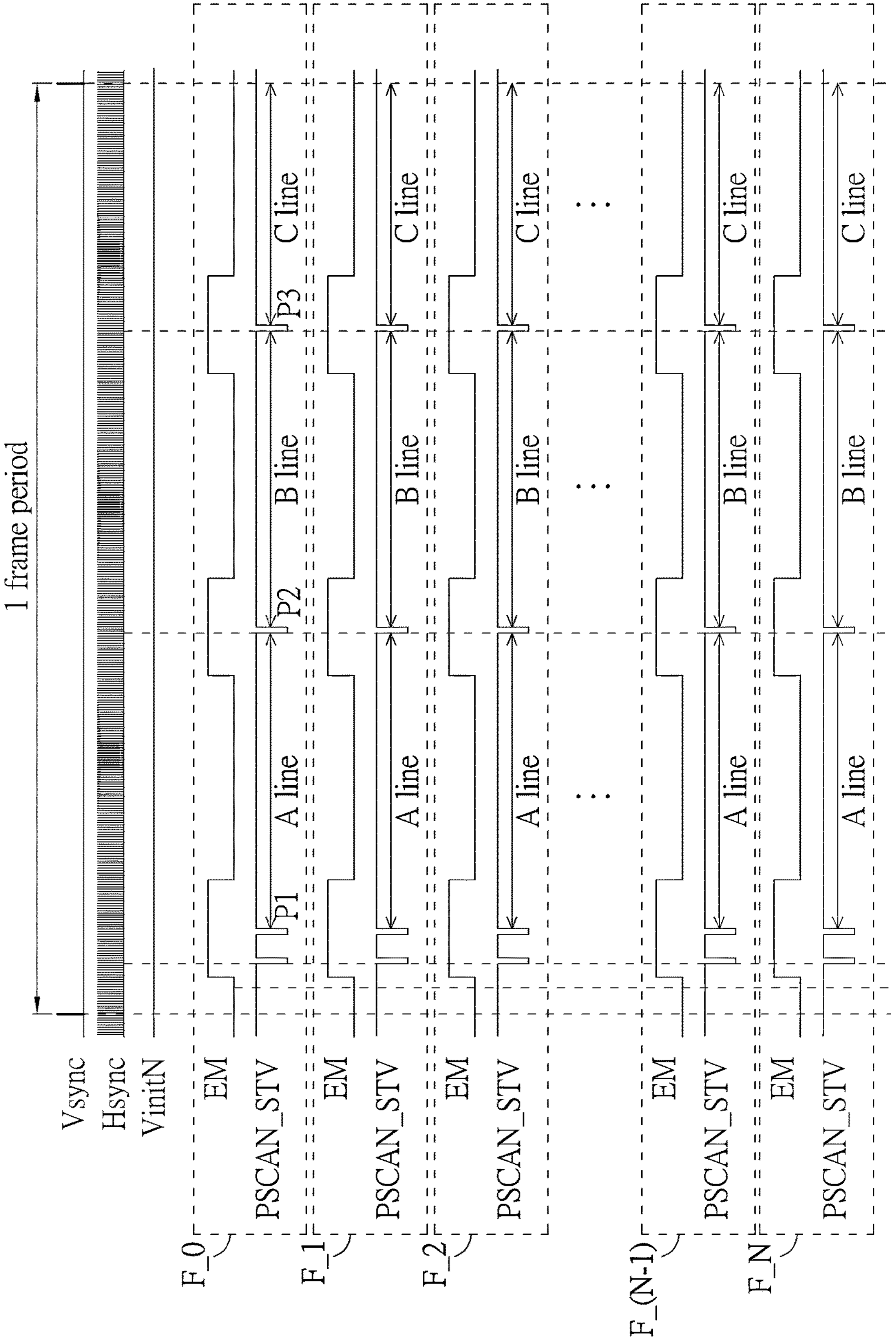
FIG. 5 is a timing diagram of a general scan timing of the scan control signals.

FIG. 5 is a timing diagram of a general scan timing of the scan control signals PSCAN_STV. In detail, FIG. 5 illustrates the emission control signal EM and the scan control signal PSCAN_STV output in a series of frame periods F_0-F_N, and the vertical synchronization signal Vsync, the horizontal synchronization signal Hsync and the initial voltage VinitN are also shown in FIG. 5 to facilitate the illustrations. The scan control signal PSCAN_STV output in each frame period F_0-F_N includes 3 pulse signals P1-P3, as similar to the case shown in FIG. 2 or 4. In the frame periods from F_0 to F_N, the scan control signals PSCAN_STV are all output with the same timing; that is, the spacing between the pulse signal P1 and the pulse signal P2 is fixed to be A lines, the spacing between the pulse signal P2 and the pulse signal P3 is fixed to be B lines, and the spacing between the pulse signal P3 and the end of the frame period is fixed to be C lines, where A, B and C may be any positive integer. In such a situation, when the pulse signal P1 reaches the porch area, the pulse signals P2 and P3 must be shifting to fixed positions, so the dark bands appear in fixed positions and regions of the display panel.

In order to improve the dark band problem, the present invention may disperse the possible positions of dark bands by changing the output timing of the scan control signal PSCAN_STV. More specifically, the spacing of two pulse signals may be variable between different frame periods by changing the timing setting. For example, a first timing setting may be applied to a frame period (e.g., F_1), where the pulse signals P1 and P2 have a first spacing therebetween; and a second timing setting may be applied to another frame period (e.g., F_2), where the pulse signals P1 and P2 have a second spacing therebetween. The first spacing and the second spacing may have different lengths to disperse the output timing of the pulse signals in the scan control signal PSCAN_STV. This will generate dispersed pulse signals in the scan signals PSCAN used for controlling the node Node_A in the pixels to be reset through the initial voltage VinitN (such as the pixel circuit 10 shown in FIG. 1). In addition, the scan signals PSCAN may also be used for controlling the node Node_B in the pixels to be reset through the initial voltage VinitP.

Figure 6:
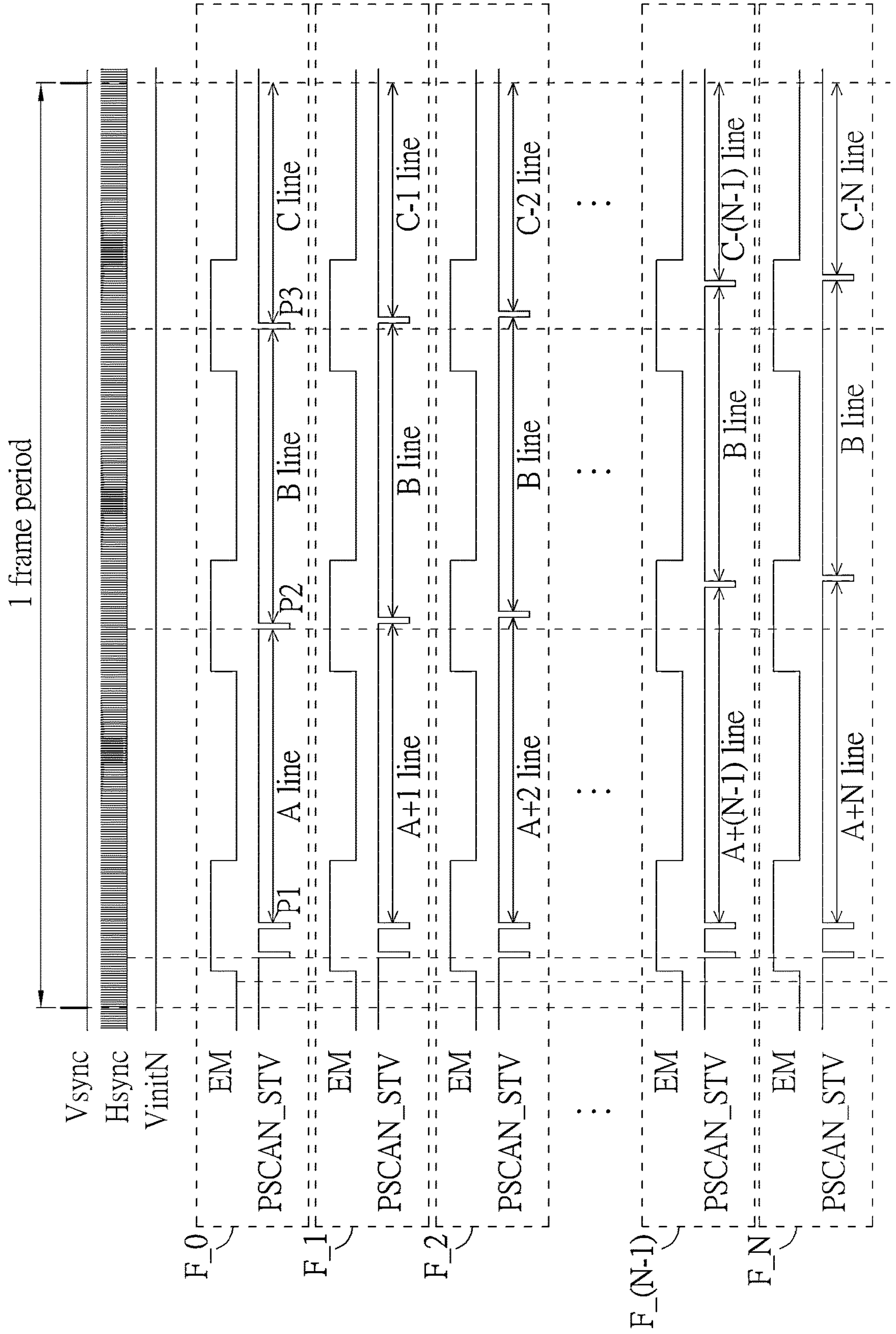
FIG. 6 is a timing diagram of a scan timing of the scan control signals according to an embodiment of the present invention.

FIG. 6 is a timing diagram of a scan timing of the scan control signals PSCAN_STV according to an embodiment of the present invention. Similarly, FIG. 6 illustrates the emission control signal EM and the scan control signal PSCAN_STV output in a series of frame periods F_0-F_N, and the vertical synchronization signal Vsync, the horizontal synchronization signal Hsync and the initial voltage VinitN are also shown in FIG. 6 to facilitate the illustrations. As shown in FIG. 6, the scan control signal PSCAN_STV in the frame period F_0 has the same output timing as in FIG. 5. In subsequent frame periods from F_1 to F_N, the pulse signals P2 and P3 of the scan control signal PSCAN_STV are delayed by 1 line time in sequence. That is, between the frame periods F_0-F_N, the output timing of the pulse signals P2 and P3 possesses a dither with equal interval, thereby dispersing the dark bands.

More specifically, as shown in FIG. 6, in the frame periods from F_1 to F_N, the spacings between the pulse signal P1 and the pulse signal P2 are A+1 lines to A+N lines, respectively; the spacings between the pulse signal P2 and the pulse signal P3 are fixed to B lines, which means that the pulse signals P2 and P3 are dispersed (e.g., delayed) in the same way; the spacings between the pulse signal P3 and the end of the frame period are correspondingly arranged to be C-1 lines to C-N lines, to maintain a constant frame period length. Note that the embodiment in FIG. 6 has a fixed frame rate, where the lengths of the frame periods F_0-F_N are all equal. In other embodiments, if a timing configuration of extended porch is applied, the spacing between the pulse signal P3 and the end of the frame period could be fixed, or adjusted according to the requirements of porch length configuration.

Therefore, as for a present frame period among F_1-F_N, the pulse signals P2 and P3 may be output with a delay of one line time with respect to the same pulse signals P2 and P3 output in the previous frame period. Note that the delay manner shown in FIG. 6 is merely an exemplary embodiment. In another embodiment, the pulse signals between every two consecutive frame periods may be delayed by any number of line times, which should not be limited to those described in this disclosure.

Note that FIG. 6 illustrates the timing of the scan control signal PSCAN_STV output by the display driver circuit 310, where the scan control signal PSCAN_STV may be output to the GOA circuits 304_1 and 304_2 on the display panel 300. One or both of the GOA circuits 304_1 and 304_2 then generate the scan signal PSCAN for each row of pixels based on the scan control signal PSCAN_STV which shifts with the scan control clock PSCAN_CLK. Therefore, the timing adjustment of the pulse signals P1-P3 in the scan control signal PSCAN_STV may also correspondingly make the pulse signals P1-P3 in the scan signals PSCAN output to the pixels have a time dither between different frames, thereby generating the dispersion effect.

Figure 7:
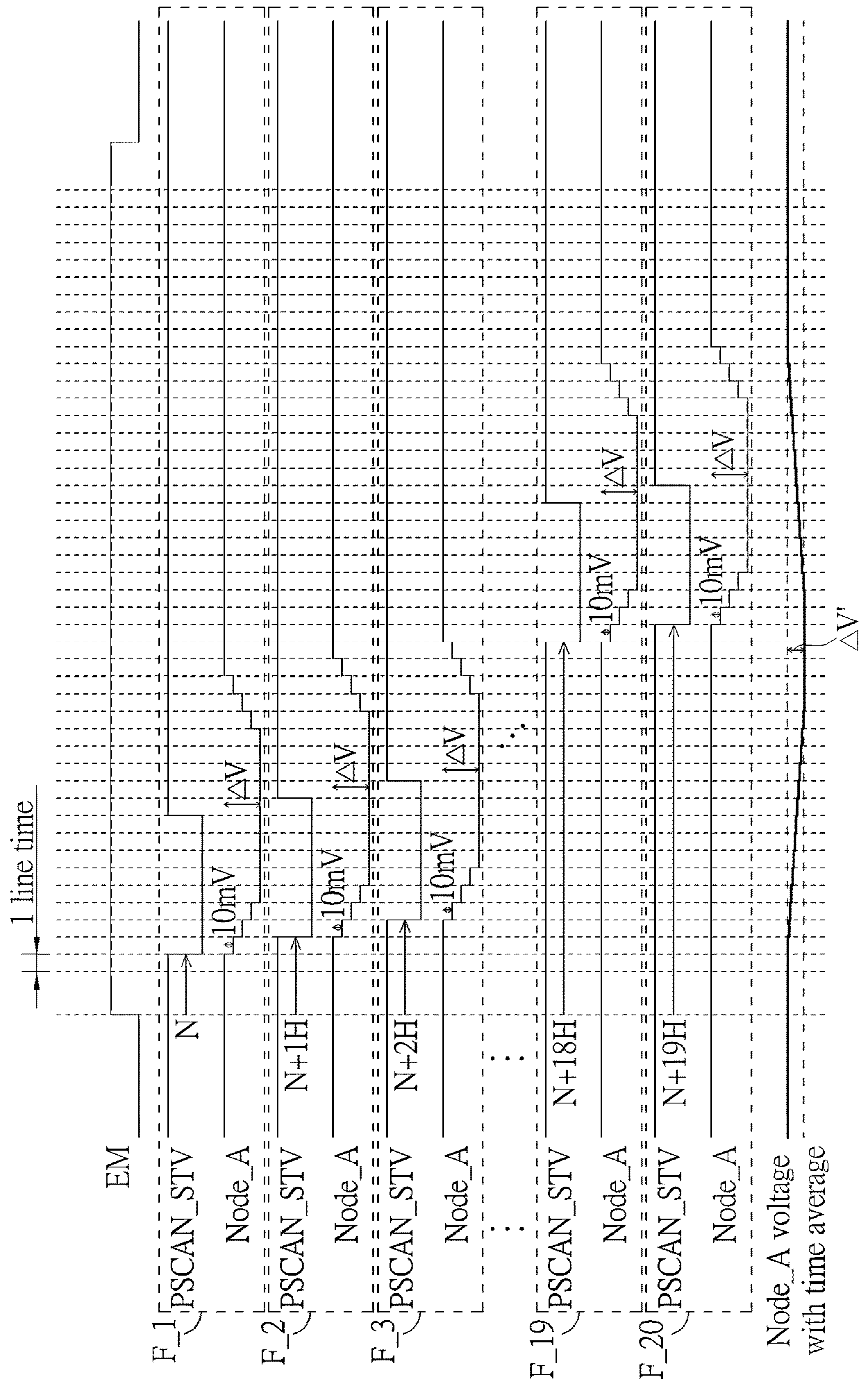
FIG. 7 is a schematic diagram of a scan control signal being dispersed within a period of time and the influence of the scan control signal on the voltage of the node.

FIG. 7 is a schematic diagram of a scan control signal PSCAN_STV being dispersed within a period of time and the influence of the scan control signal PSCAN_STV on the voltage of the node Node_A, where the scan control signal PSCAN_STV and the voltage of the node Node_A in 20 consecutive frame periods F_1-F_20 and the related emission control signal EM are shown. FIG. 7 illustrates the situation of sequentially outputting a pulse signal of the scan control signal PSCAN_STV with 1-line (1H) delay during the frame periods F_1-F_20, which is similar to the method of dispersing the pulse signals P2 and P3 in FIG. 6. Ideally, the initial voltage VinitN should keep at a constant voltage level. However, since a certain pulse signal enters the porch area, the load of the initial voltage VinitN is reduced, so that the voltage received by the node Node_A drops within a period of time corresponding to the porch area. The maximum voltage drop may be ΔV (equivalent to the offset of VinitN). Note that no matter how the pulse signal shifts or dithers, it should be covered by the high pulse of the emission control signal EM where light emission is disabled, in order to avoid that the image display is affected, as shown in FIG. 7.

In detail, the pulse signal may cover several line times, and enter the porch area line by line, so that the load may decrease gradually, and the corresponding behavior of the node Node_A is that the voltage decreases step by step. When the voltage of the node Node_A drops to the maximum offset ΔV, it means that a pulse signal entirely enters the porch area. In this embodiment, assuming that the voltage of the node Node_A decreases by 10 mV when the load of one line of pixels is reduced, the maximum offset ΔV will be equal to 40 mV. If the output timing of the pulse signal is not dispersed, the difference between the voltage of Node_A in the pixels in the dark band and the voltage of Node_A in the pixels in other areas may be substantially equal to 40 mV.

FIG. 7 illustrates the situation where the pulse signal of the scan control signal PSCAN_STV in the 20 frame periods F_1-F_20 are output with sequential delays of one line time (i.e., 1H delay), and thus the voltage drop generated at the node Node_A has a corresponding delay. Therefore, in an average of the frame periods F_1-F_20, different degrees of average voltage drops are generated at the node Node_A in the pixels of different positions. In terms of visual effects, the final voltage drop is equivalent to the average of voltage drops in these frame periods F_1-F_20; hence, the 10 mV voltage difference at each step in each frame is averaged, thereby generating only a 0.5 mV contribution. In this embodiment, the maximum degree of voltage drop ΔV' at the node Node_A after average is reduced to approximately 26 mV (where the maximum voltage offset is 40 mV originally), and the average voltage variation at the node Node_A in the area affected by the voltage drop is relatively smoother, making the dark band on the screen less obvious and difficult for the human eye to perceive. From the analysis of voltage drop behaviors in FIG. 7, it can be seen that if the pulse signal is dispersed in more frame periods, the improvement of the dark band will be better.

Figure 8:
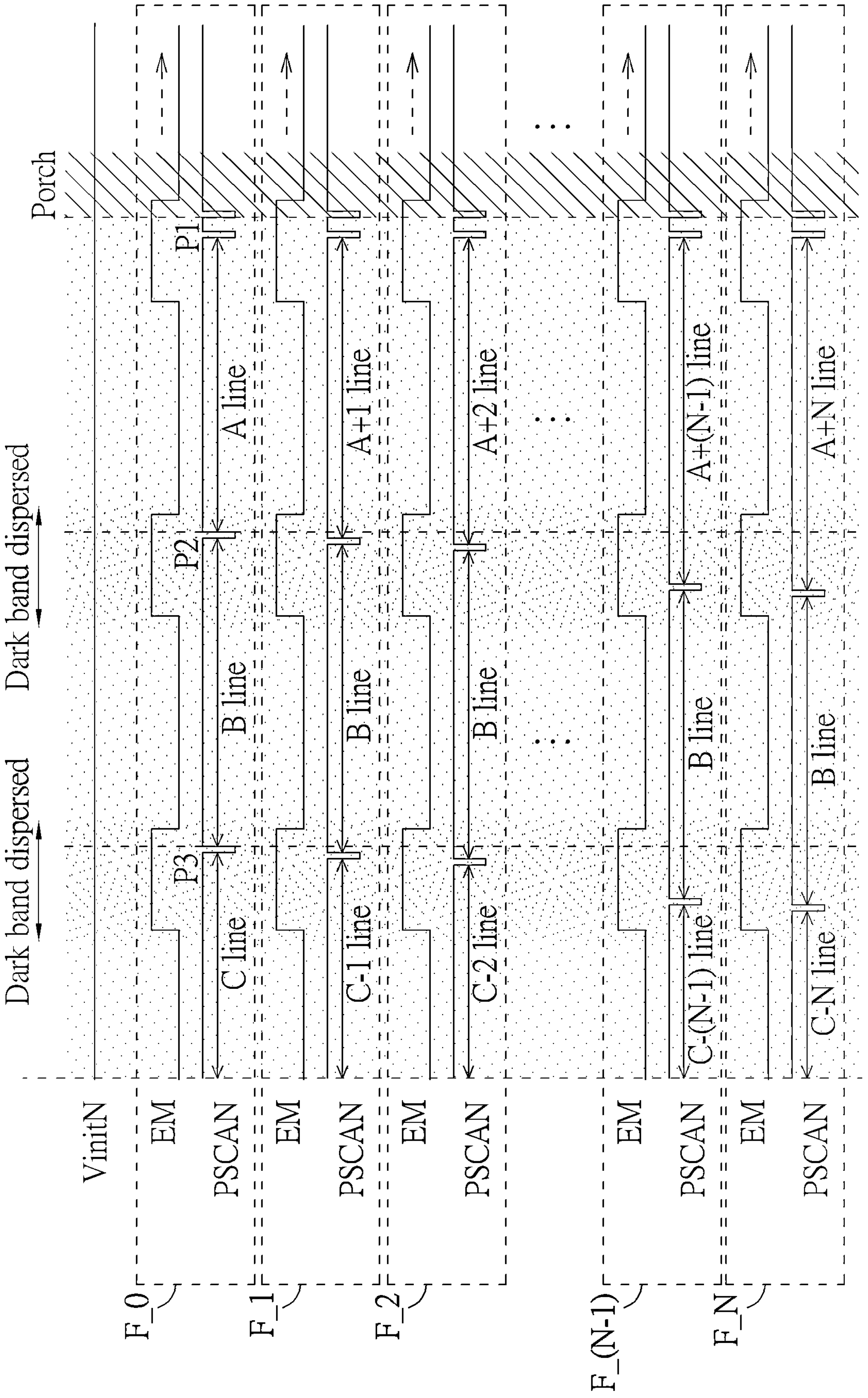
FIG. 8 illustrates the behavior of the pulse signals of the scan signal generated from the scan control signal in a series of frame periods.

FIG. 8 illustrates the behavior of the pulse signals P1-P3 of the scan signal PSCAN generated from the scan control signal PSCAN_STV in a series of frame periods F_0-F_N, where the emission control signal EM is also shown in FIG. 8 to facilitate the illustrations. FIG. 8 shows the shifting of the pulse signals P1-P3 from the perspective of panel scan timing, which corresponds to the timing of the signals output by the display driver circuit 310 as shown in FIG. 6. In this embodiment, the shift/dither is performed in the spacings between the pulse signals P1 and P2. Due to this shift/dither, when the pulse signal P1 enters the porch area, the positions of the pulse signal P2 in different frame periods are different, and the positions of the pulse signal P3 in different frame periods are also different. Therefore, the dark bands corresponding to the positions of the pulse signals P2 and P3 are dispersed.

It should be noted that although the abovementioned method of controlling the pulse signals of the scan control signal PSCAN_STV to shift sequentially in several consecutive frame periods can disperse the dark band position, due to the fixed shift rate, there may be water ripples or persistence of vision that moves in a fixed frequency appearing on the display image. In order to solve this problem, the number of shifting lines may be changed frame by frame to vary the shift rate. For example, the spacing between the pulse signals P1 and P2 in the frame period F_1 may be A+1 lines, in the frame period F_2 may be A+2 lines, in the frame period F_3 may be increased to A+4 lines, and in the frame period F_4 may be increased to A+7 lines. The spacings between the pulse signals may be adjusted arbitrarily according to system requirements, and will not be limited to those described in this disclosure.

In order to further enhance the visual effects, in an embodiment, the timing of outputting the pulse signals of the scan control signal PSCAN_STV may be dispersed randomly, so as to disperse the dark bands randomly. Therefore, the spacing between any two pulse signals may have a random length.

Figure 9:
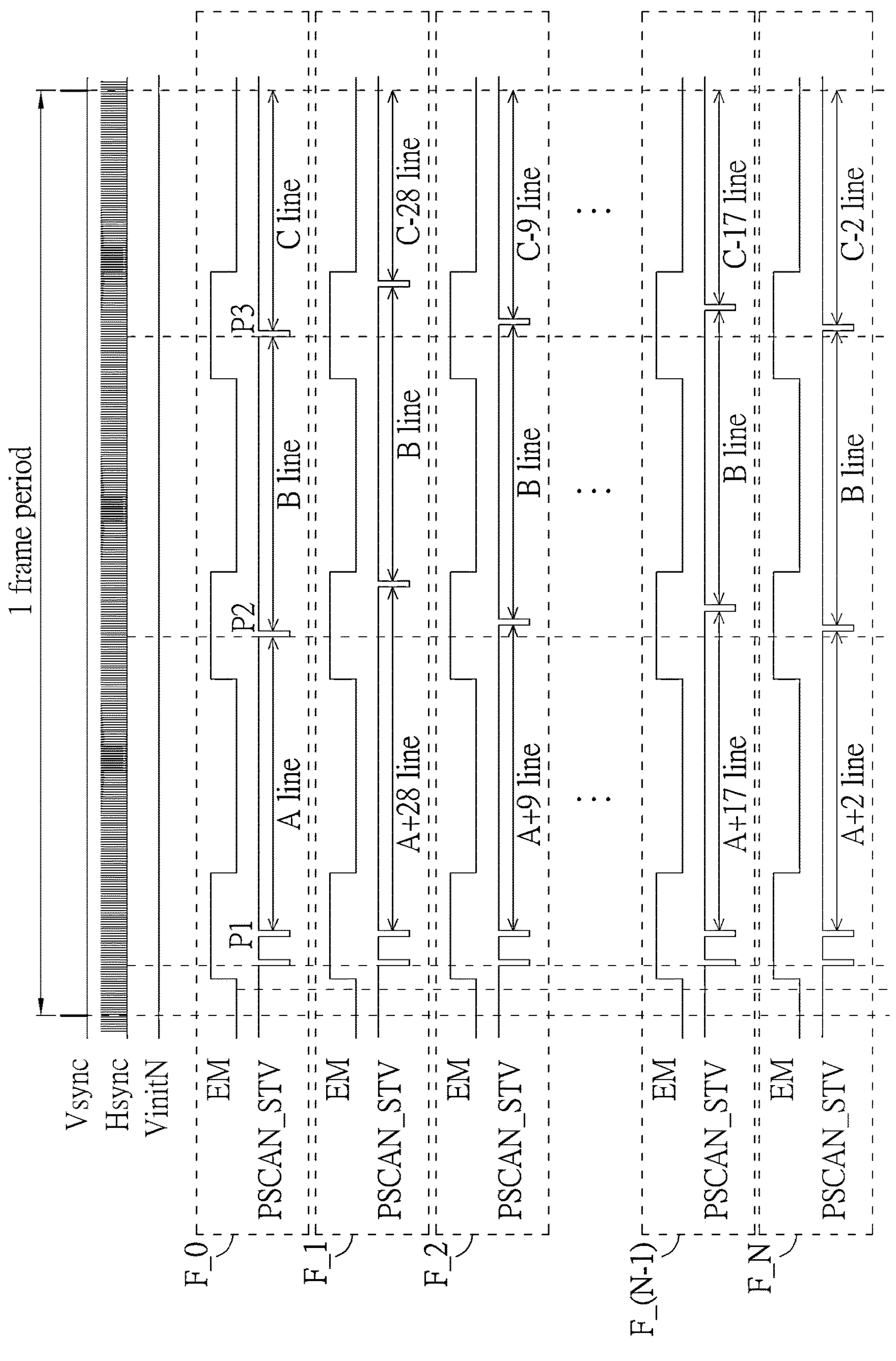
FIG. 9 is a timing diagram of a scan timing of the scan control signals according to an embodiment of the present invention.

FIG. 9 is a timing diagram of a scan timing of the scan control signals PSCAN_STV according to an embodiment of the present invention. Similarly, FIG. 9 illustrates the emission control signal EM and the scan control signal PSCAN_STV output in a series of frame periods F_0-F_N, and the vertical synchronization signal Vsync, the horizontal synchronization signal Hsync and the initial voltage VinitN are also shown in FIG. 9 to facilitate the illustrations. As shown in FIG. 9, the pulse signal P1 may be output at the same line in the frame periods F_0-F_N, and the other pulse signals P2 and P3 are output with dithers, where the dithering time of these pulse signals P2 and P3 between the frame periods F_0-F_N is random. Through the random dithering, the dark bands on the image may still be improved, and the problem of persistence of vision may also be avoided.

Figure 10:
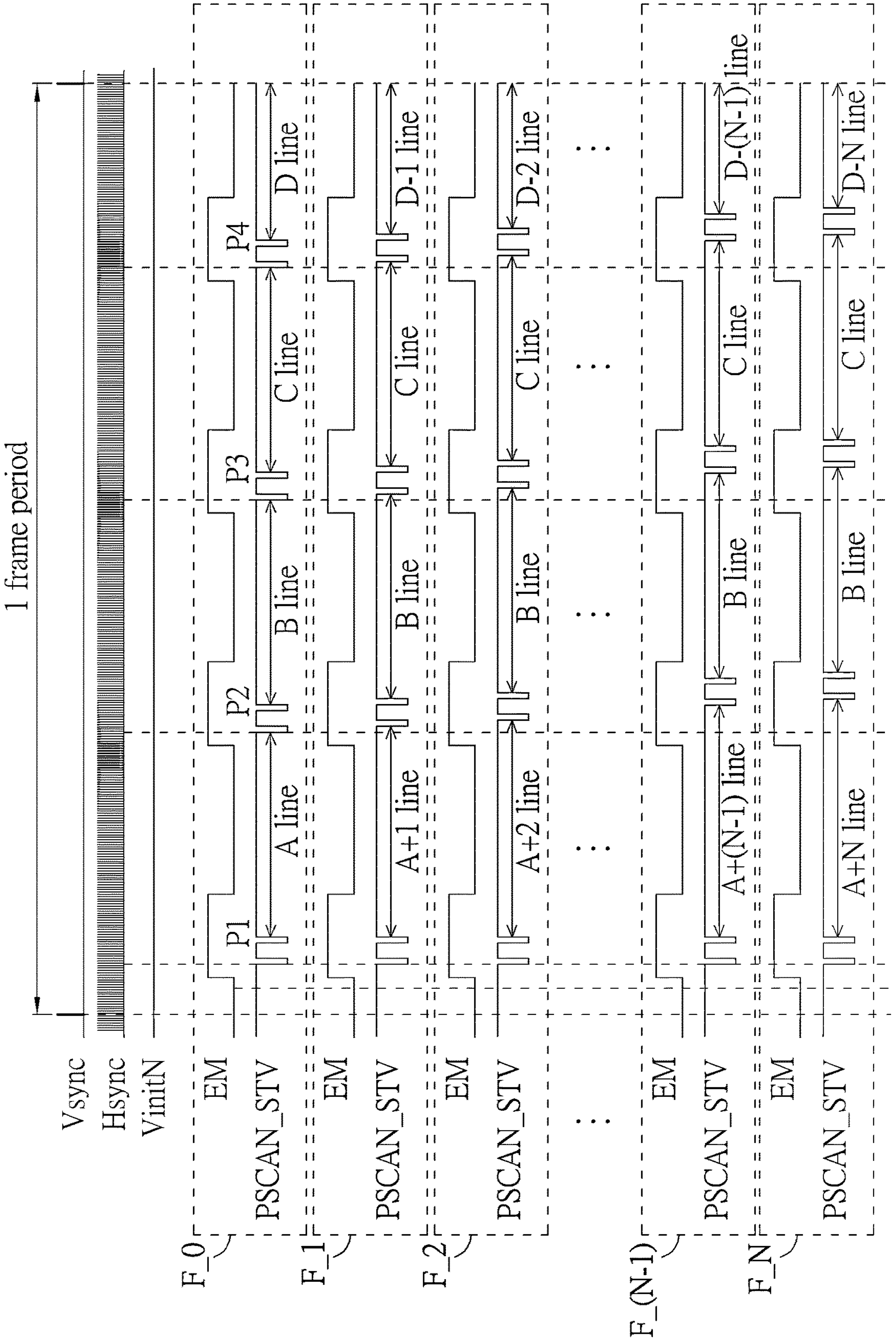
FIG. 10 is a timing diagram of a scan timing of the scan control signals having 4 pulse signals according to an embodiment of the present invention.

In addition, in the above embodiments, there are 3 pulse signals P1-P3 in the scan control signal PSCAN_STV output in a frame period, in order to reset the light emitting device in the pixels 3 times, but the implementations of the present invention are not limited thereto. In another embodiment, there may be 4 pulse signals included in the scan control signal PSCAN_STV to perform 4 resets in one frame period, as shown in FIG. 10. Similarly, as long as the spacing of the pulse signals P1 and P2 changes between different frames, a time dither may be generated in the output timing of the scan control signal PSCAN_STV in subsequent frame periods, and thus may be generated in the scan signals PSCAN which are received by the pixels on the display panel 300. In the embodiment shown in FIG. 10, each pulse signal P1-P4 contains 2 pulses. In fact, in the embodiments of the present invention, each pulse signal of the scan control signal PSCAN_STV may be implemented by using any number of pulses, which should not limit the scope of the present invention.

Figure 11:
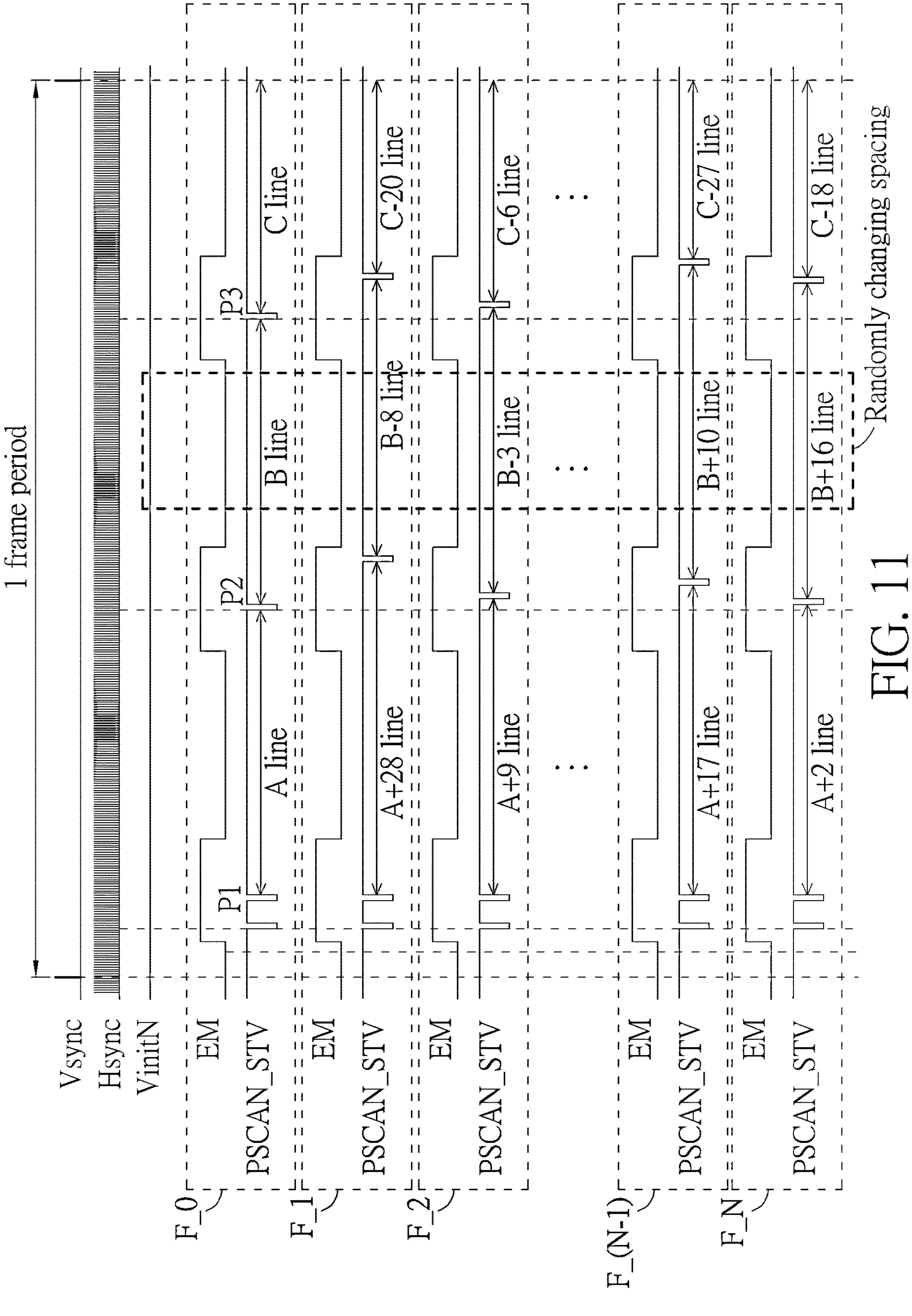
FIG. 11 is a timing diagram of another scan timing of the scan control signals according to an embodiment of the present invention.

In another embodiment, the spacing between the pulse signals P2 and P3 (or even subsequent pulse signals if any) may also change in a random manner. For example, as shown in FIG. 11, in addition to dynamically and randomly changing the spacing length between the pulse signals P1 and P2, the spacing length between the pulse signals P2 and P3 may also change dynamically and randomly, and the time after the last pulse signal P3 may be adjusted correspondingly to keep the overall length of the frame period fixed (or correspondingly change to be adapted to the porch length). As a result, the dispersion effect of the dark bands may further be enhanced.

Figure 12:
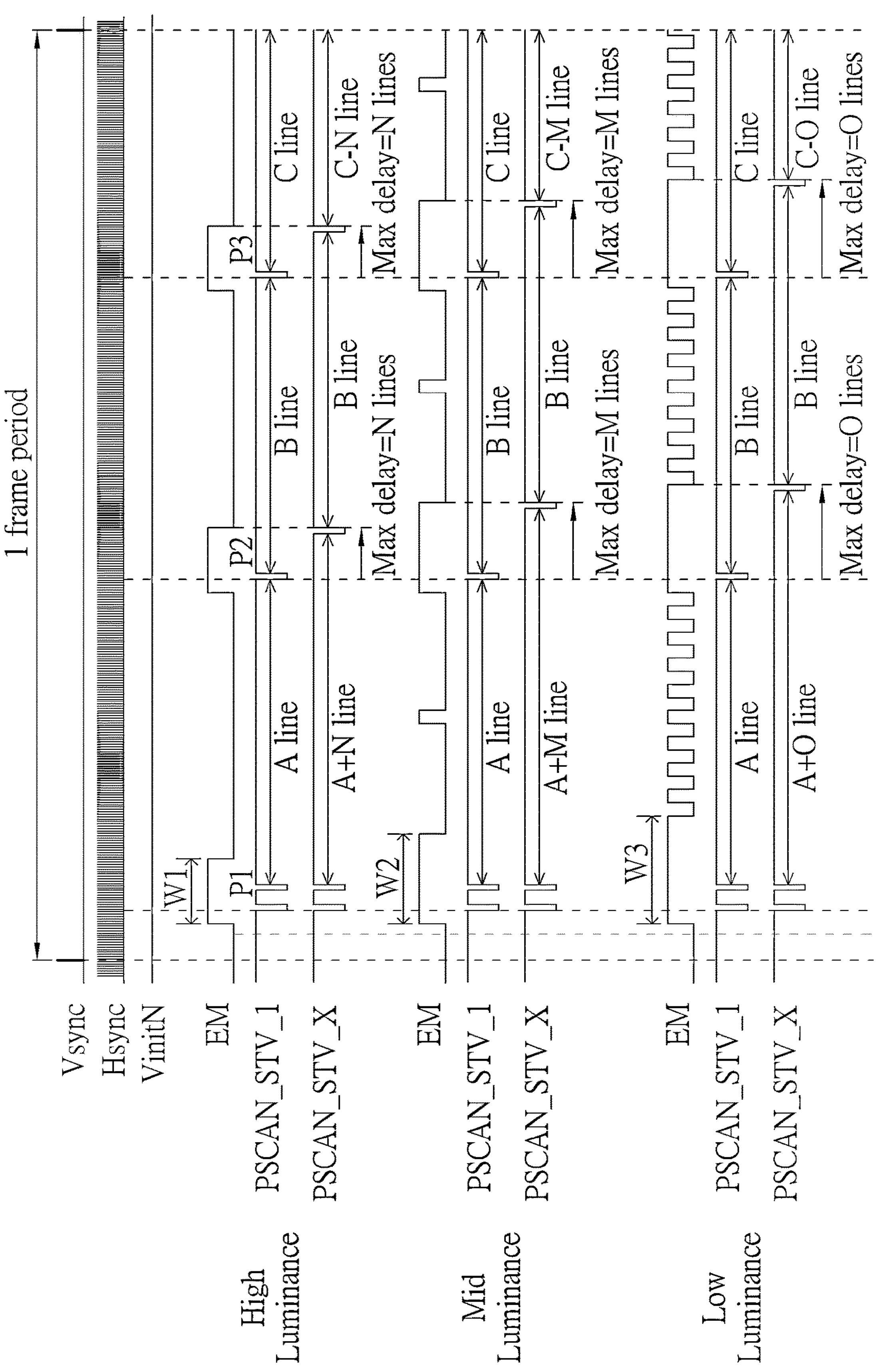
FIG. 12 is a timing diagram of dispersing the pulse signals based on different luminance settings according to an embodiment of the present invention.

In an embodiment, the adjustable range of the pulse signals may be adjusted to be adapted to the luminance setting of the display panel 300, such as the DBV as described above. Therefore, if the pulse signals are output with a time dither between different frame periods, the range of the time dither may be controlled according to the luminance setting. For example, FIG. 12 is a timing diagram of dispersing the pulse signals based on different luminance settings according to an embodiment of the present invention. As mentioned above, the pulse signals P1-P3 of the scan control signal PSCAN_STV should be covered by the high pulse of the emission control signal EM where light emission is disabled, in order to avoid that the image display is affected. The width and number of high pulses included in the emission control signal EM in one frame period will change with the settings of luminance.

Preferably, the range of the time dither may increase when the luminance of the display panel 300 decreases. More specifically, when the luminance is lower, the period during which the emission control signal EM is high is longer, and thus the width of the high pulse of the emission control signal EM may be longer and/or the number of the high pulse of the emission control signal EM may be larger. Taking FIG. 12 as an example, where there are 3 high pulses included in the emission control signal EM under high luminance; there are 6 high pulses included in the emission control signal EM under medium (mid) luminance and the width of the high pulses covering the pulse signals P1-P3 is larger; and there are 18 high pulses included in the emission control signal EM under low luminance and the width of the high pulses covering the pulse signals P1-P3 is the largest.

More specifically, as shown in FIG. 12, under the high luminance case, the pulse signals P1-P3 should be covered by the width W1 of the high pulse of the corresponding emission control signal EM. If the spacing between the pulse signals P1 and P2 is A lines in the first scan control signal PSCAN_STV_1, this spacing in a subsequent scan control signal PSCAN_STV_X (X may be any positive integer other than 1) may be extended to A+N lines in maximum (i.e., with the maximum delay of N lines), allowing the pulse signal P2 to be within the range covered by the high pulse of the emission control signal EM. Under the medium luminance case, the pulse signals P1-P3 should be covered by the width W2 of the high pulse of the corresponding emission control signal EM, where the width W2 is longer than W1. If the spacing between the pulse signals P1 and P2 is A lines in the first scan control signal PSCAN_STV_1, this spacing in a subsequent scan control signal PSCAN-_STV_X may be extended to A+M lines in maximum (i.e., with the maximum delay of M lines), allowing the pulse signal P2 to be within the range covered by the high pulse of the emission control signal EM. Under the low luminance case, the pulse signals P1-P3 should be covered by the width W3 of the high pulse of the corresponding emission control signal EM, where the width W3 is longer than W2 and W1. If the spacing between the pulse signals P1 and P2 is A lines in the first scan control signal PSCAN_STV_1, this spacing in a subsequent scan control signal PSCAN_STV_X may be extended to A+O lines in maximum (i.e., with the maximum delay of O lines), allowing the pulse signal P2 to be within the range covered by the high pulse of the emission control signal EM. Note that the parameters N, M and O may be any positive integer. With the luminance relationship between these three cases, the maximum delay will satisfy the relationship O>M>N.

Similarly, the timing of the pulse signal P3 may be controlled based on the corresponding emission control signal EM, i.e., to be covered by the high pulse of the emission control signal EM. As a result, due to the difference in the high pulse widths of the emission control signal EM, the display driver circuit 310 may accordingly adjust the dithering range of the pulse signals P1-P3 under different luminance. That is, under a lower luminance, the high pulse of the emission control signal EM may be wider, and the dithering range of the pulse signals P1-P3 may be larger.

In general, the dark band phenomenon is usually observed more easily under low luminance. Therefore, when the luminance is set to be lower, it is preferable to increase the dithering range of the pulse signals to be adapted to the width of the high pulse of the emission control signal EM, to increase the dark band improvement effects. On the contrary, the dark band is less obvious under high luminance, and the usage of a smaller dithering range may achieve satisfactory effects.

Figure 13:
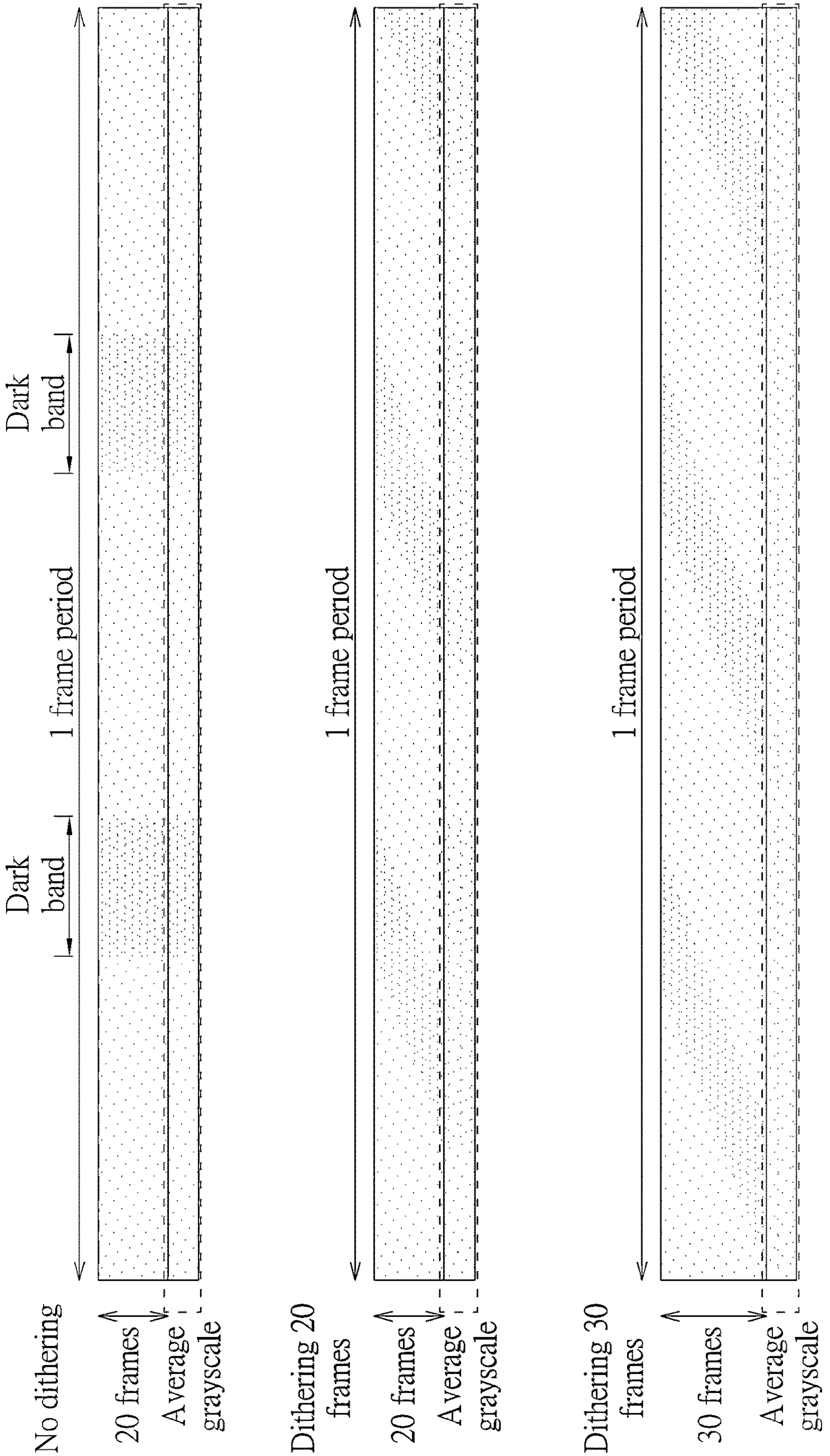
FIG. 13 is a schematic diagram of the dark bands generated by simulating the voltage offset of the node with and without inter-frame dithering in the scan control signal.

FIG. 13 is a schematic diagram of the dark bands generated by simulating the voltage offset of the node Node_A with and without inter-frame dithering in the scan control signal PSCAN_STV. As can be seen from Formula (1) described in the above paragraphs, the voltage offset ΔV of the node Node_A is equivalent to a deviation of the display data VD to change the driving current I1 and thereby influence the brightness, and thus could be simulated as a grayscale change corresponding to different brightness. As shown in FIG. 13, the horizontal axis is the voltage offset ΔV of the node Node_A in multiple lines of pixels in one frame period, expressed as the brightness corresponding to the grayscale value, where the maximum voltage difference may be, for example, 40 mV. The vertical axis represents 20 or 30 consecutive frames (i.e., frame periods), and the average grayscale refers to the average of these 20 or 30 frames of images, which is equivalent to what the human eyes see.

Figure 14:
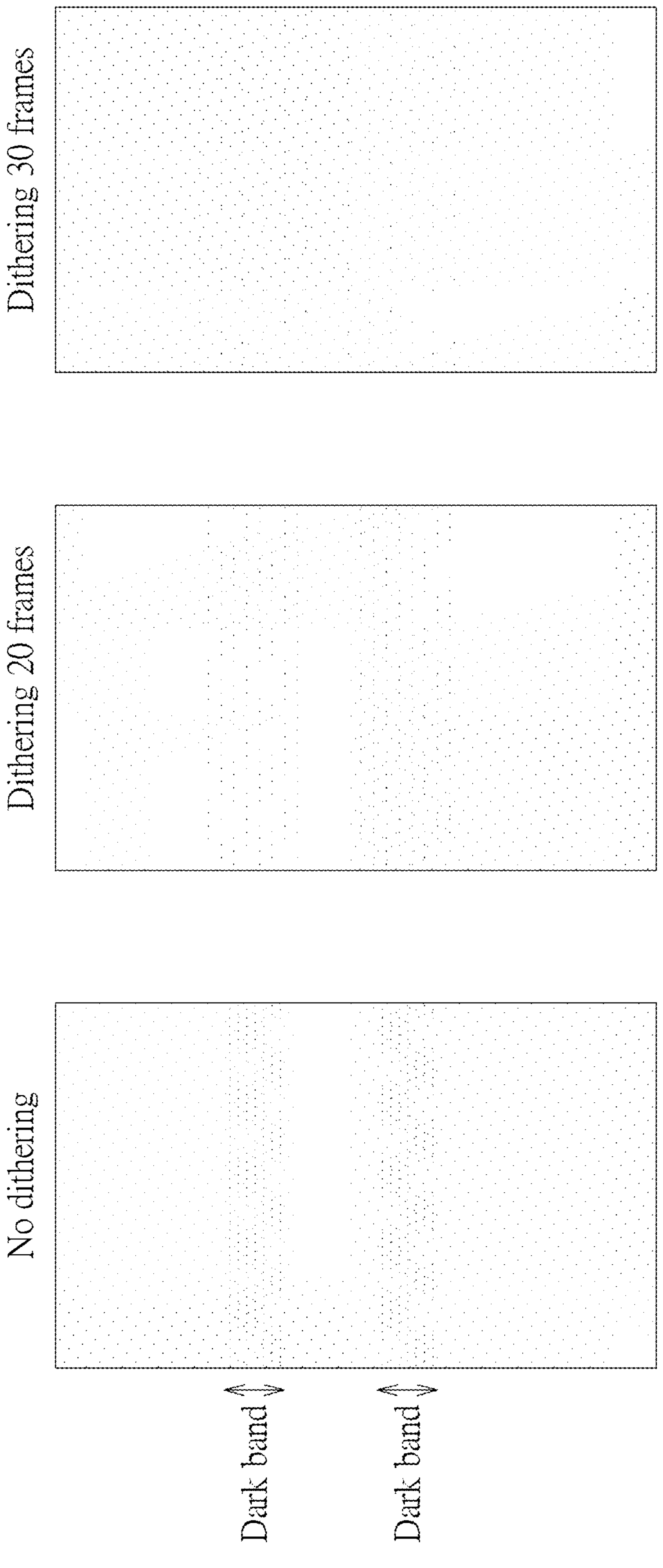
FIG. 14 illustrates simulated image contents showing the dark band improvement.

As shown in FIG. 13, in the scenario where the pulse signals of the scan control signal are output in a fixed timing without inter-frame dithering, the voltage drop of the node Node_A may appear at fixed positions, which is equivalent to an increase in grayscale value to generate a darker image, thereby forming an evident dark band in fixed areas. When 20-frame dithering is applied and the pulse signals in the 20 frame periods are output in a timing with sequential one-line delay (such as the output timing shown in FIG. 6), the position of the dark bands may shift corresponding to the delay. After averaging over the 20 frame periods, the light and dark variations in the average grayscale become gentle. When 30-frame dithering is applied and the pulse signals in the 30 frame periods are output in a timing with sequential one-line delay, the position of the dark bands may shift corresponding to the delay. After averaging over the 30 frame periods, the positions where the voltage drop of the node Node_A appears may further be dispersed, to achieve a better effect of dark band improvement. As a result, if the number of frames in timing dithering for the pulse signals is increased, the effect of dark band improvement will be better. The effect of dark band improvement can be clearly seen from the simulated image content shown in FIG. 14.

From the above, it can be seen that through the method of dispersing/shifting/dithering the pulse signals of the scan control signal as provided in the embodiments of the present invention, the voltage difference of the node Node_A in the pixel circuits may be significantly improved, and the voltage difference of the node Node_A between adjacent pixel lines will become smoother, thus improving the dark band problem. The node Node_A may be a node coupled to the light emitting device of the pixel, and thus the voltage offset or voltage difference of the node Node_A will influence the brightness of the pixel. Such a voltage offset or voltage difference may be decreased by dispersing the pulse signals of the scan control signal. In addition, since the positions where the voltage difference of the node Node_A appears are not fixed in each frame, the problem of long-term stress difference in a specific area (i.e., the dark band area) will not exist, thereby improving the reliability of the display panel.

Note that the method of the present invention does not aim at completely eliminating the dark band caused by the variations of the initial voltage (such as VinitN), but is to disperse the positions where the voltage difference of the node Node_A appears in different frames, to scatter the dark band to reduce the impact of the dark band on visual effects. In some embodiments, since the average voltage difference of the node Node_A becomes gentle, this small voltage difference may further be compensated through Demura. Demura is a compensation method commonly used in OLED panels, where the data voltages to be output to the display panel may be adjusted to compensate for small brightness differences caused by device variations in the pixel circuits. In general, when the dark bands are not dispersed, the brightness difference between the dark band areas and other areas is usually too large, making it difficult to be dealt with through Demura. In contrast, the present invention may first disperse the dark bands by changing the output timing of the pulse signals in the scan control signal, so that the average brightness difference at different positions of the display panel caused by the load variation of the initial voltage may be reduced. After the image is improved to a certain extent, compensation will be made through Demura to achieve a further improvement.

Figure 15:
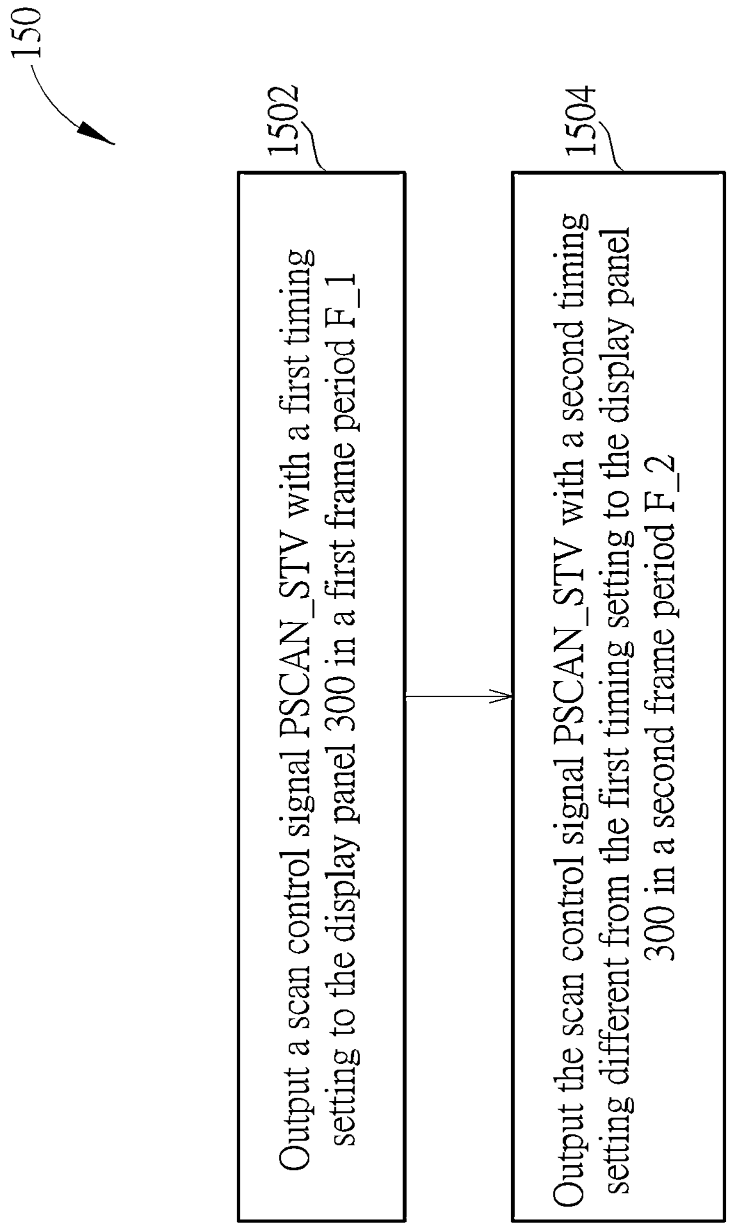
FIG. 15 is a flowchart of a control process according to an embodiment of the present invention.

The abovementioned operations of dispersing the dark band positions may be summarized into a control process 150, as shown in FIG. 15. The control process 150 may be implemented in a display driver circuit for controlling a display panel, such as the display driver circuit 310 for controlling the display panel 300 shown in FIG. 3. As shown in FIG. 15, the control process 150 includes the following steps:

Step 1502: Output a scan control signal PSCAN_STV with a first timing setting to the display panel 300 in a first frame period F_1.

Step 1504: Output the scan control signal PSCAN_STV with a second timing setting different from the first timing setting to the display panel 300 in a second frame period F_2.

According to the control process 150, the scan control signal PSCAN_STV with different timing settings will be converted into the scan signals PSCAN to be output to the pixels on the display panel 300, thereby dispersing the dark bands on the display panel 300. The scan control signals PSCAN_STV and the scan signals PSCAN having different timing settings may be arranged to have pulse signals output at different line times. The detailed operations and alterations are described in the above paragraphs, and will not be narrated herein.

Note that the present invention aims at providing a novel method of controlling a display panel and a related display driver circuit capable of outputting a scan control signal with inter-frame dithering to improve the dark band problem. Those skilled in the art may make modifications and alterations accordingly. For example, in the above embodiments, since the emission control signals and the scan signals are all received by PMOS transistors in the pixel circuits, these signals are low-active signals. In another embodiment, several control signals for the pixel circuits may be high-active signals if these signals are used to control the NMOS transistors in the pixel circuits. The related implementations should also belong to the scope of the present invention.

To sum up, the present invention may disperse the possible positions of dark bands on the display panel by changing the output timing of the scan control signals in multiple consecutive frames. Since the cause of the dark band is that the initial voltage used to reset the light emitting device (e.g., at the node Node_A) has a load difference when one of the pulse signals shifts to the porch area, the initial voltage received by the pixels located in certain fixed lines appears to have an offset or voltage drop, resulting in a horizontal dark band at the positions of these lines. Therefore, the display driver circuit of the present invention may change the timing of the scan control signals for the initial voltage, to form dithering at the output time of the pulse signals between different frame periods, so as to dynamically change the offset position of the initial voltage. Under long-term display, the average voltage drop of the initial voltage for resetting the light emitting device may be reduced, and the voltage offset between adjacent pixel lines may be reduced, to improve the dark band phenomenon. The above operations are mainly used for the initial voltage for initializing the light emitting device in the pixel circuits, to prevent the offset or voltage drop of the initial voltage from appearing on the pixels in fixed lines. Since the scan signals are also used to control the reset of the driving transistor (e.g., at the node Node_B), changing the output timing of the scan signals may also reduce the impact of load variations faced by the source voltage of the driving transistor on the brightness.

Furthermore, the timing of the scan control signals may be adjusted sequentially or dispersed randomly within multiple frame periods, as long as the positions where the initial voltage offset occurs are staggered. The method of changing the timing of the present invention is applicable to different luminance settings. No matter whether it is in high luminance, medium luminance or low luminance, the dark band problem may be improved by dithering the output timing of the scan control signals. In addition, there are wider high pulses of the emission control signal under low luminance, and the range of the pulse signal adjustment may be correspondingly increased to be adapted to the phenomenon of more obvious dark bands under low luminance. The above method may further be combined with Demura compensation to enhance the effect of dark band dispersion.

In addition, the present invention may significantly improve the dark band problem only by adjusting the timing of the display driver circuit outputting the scan control signals. There is no need to change the structure of the display panel and no need to adjust the output level of the initial voltage. The constant output level of the initial voltage is helpful to control the cross-voltage of the light emitting device to be constant and is able to maintain the reaction speed of data writing to avoid image sticking. It may also prevent the changes in the initial voltage from affecting other areas without a dark band or causing other side effects, so as to avoid unpredictable voltage/current variations that cause defects in visual effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a display panel, the display panel comprising a plurality of pixels, the method comprising:

outputting a scan control signal to a gate-on-array (GOA) circuit of the display panel in a plurality of frame periods, wherein the scan control signal has a first timing setting in a first frame period among the plurality of frame periods, and has a second timing setting in a second frame period among the plurality of frame periods, wherein the second timing setting is different from the first timing setting, and wherein the GOA circuit generates a plurality of scan signals according to the scan control signal and outputs the plurality of scan signals to the plurality of pixels respectively and sequentially.

2. The method of claim 1, wherein the plurality of scan signals control the plurality of pixels to receive an initial voltage.

3. The method of claim 2, wherein the initial voltage is output to a light emitting device of each of the plurality of pixels according to the plurality of scan signals.

4. The method of claim 1, wherein the scan control signal shifts in a plurality of channels corresponding to the plurality of pixels, to generate the plurality of scan signals.

5. The method of claim 1, wherein the scan control signal comprises a plurality of pulse signals in each of the plurality of frame periods.

6. The method of claim 5, wherein in the first timing setting, a first pulse signal and a second pulse signal among the plurality of pulse signals have a first spacing therebetween, and in the second timing setting, the first pulse signal and the second pulse signal have a second spacing therebetween, and wherein the first spacing and the second spacing have different lengths.

7. The method of claim 6, wherein each of the first spacing and the second spacing has a random length.

8. The method of claim 5, further comprising:

outputting an emission control signal to the display panel, the emission control signal having a first level for disabling a light emitting device of the plurality of pixels, wherein the plurality of pulse signals are output when the emission control signal is in the first level.

9. The method of claim 5, wherein each of the plurality of pulse signals comprises one or more pulses.

10. The method of claim 1, wherein the scan control signal comprises a plurality of pulse signals, and a first pulse signal among the plurality of pulse signals is output with a time dither between the plurality of frame periods.

11. The method of claim 10, wherein the first pulse signal in a present frame period among the plurality of frame periods is output with a delay of a specific number of line time with respect to the first pulse signal output in a previous frame period previous to the present frame period among the plurality of frame periods.

12. The method of claim 10, wherein a range of the time dither is controlled according to a setting of a luminance of the display panel.

13. The method of claim 12, wherein the range of the time dither increases when the luminance of the display panel decreases.

14. A method of controlling a display panel, the display panel comprising a plurality of pixels, the method comprising:

outputting a scan control signal to the display panel in a plurality of frame periods, wherein the scan control signal has a first timing setting in a first frame period among the plurality of frame periods, and has a second timing setting in a second frame period among the plurality of frame periods, wherein the second timing setting is different from the first timing setting, wherein a plurality of scan signals generated from the scan control signal are output to the plurality of pixels respectively and sequentially, wherein the scan control signal comprises a plurality of pulse signals, and a first pulse signal among the plurality of pulse signals is output with a time dither between the plurality of frame periods, and wherein a range of the time dither is controlled according to a setting of a luminance of the display panel.

* * * * *